(12) United States Patent
Lee et al.

(10) Patent No.: US 8,498,277 B2
(45) Date of Patent: Jul. 30, 2013

(54) APPARATUS AND METHOD OF TRANSMITTING/RECEIVING MBMS

(75) Inventors: Young Dae Lee, HaNam-shi (KR); Sung Duck Chun, Anyang (KR); Myung Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1043 days.

(21) Appl. No.: 11/316,726

(22) Filed: Dec. 23, 2005

(65) Prior Publication Data

US 2006/0209870 A1    Sep. 21, 2006

(30) Foreign Application Priority Data

Feb. 15, 2005    (KR) .................. 10-2005-0012445

(51) Int. Cl.
*H04Q 7/24* (2006.01)

(52) U.S. Cl.
USPC ........... 370/338; 370/312; 370/328; 370/389; 370/341; 370/310; 370/315; 370/334; 370/336; 455/426.1; 455/449; 455/69; 714/746

(58) Field of Classification Search
USPC ................ 370/312, 389, 338, 328, 341, 355, 370/310, 315, 334, 336; 455/426.1, 449, 455/69
See application file for complete search history.

(56) References Cited

U.S. PATENT DOCUMENTS

| | | | |
|---|---|---|---|
| 6,256,509 B1 | 7/2001 | Tanaka et al. | |
| 2002/0181427 A1* | 12/2002 | Sparr et al. | 370/338 |
| 2003/0207696 A1 | 11/2003 | Willenegger et al. | |
| 2004/0001472 A1* | 1/2004 | Kwak et al. | 370/342 |
| 2004/0087320 A1 | 5/2004 | Kim et al. | |
| 2004/0229605 A1* | 11/2004 | Hwang et al. | 455/426.1 |
| 2005/0022098 A1* | 1/2005 | Vayanos et al. | 714/776 |
| 2005/0075142 A1* | 4/2005 | Hoffmann et al. | 455/562.1 |
| 2005/0086182 A1* | 4/2005 | Nagy et al. | 705/412 |
| 2005/0213575 A1* | 9/2005 | Shin et al. | 370/389 |
| 2005/0259616 A1* | 11/2005 | Major et al. | 370/329 |
| 2006/0146749 A1* | 7/2006 | Lundh et al. | 370/331 |
| 2006/0274712 A1* | 12/2006 | Malladi et al. | 370/345 |

FOREIGN PATENT DOCUMENTS

| | | |
|---|---|---|
| CN | 1235437 | 11/1999 |
| EP | 1353523 A1 | 10/2003 |
| JP | 2003158486 | 5/2003 |
| JP | 2004328397 | 11/2004 |
| JP | 2005525032 | 8/2005 |
| KR | 1020030097373 | 12/2003 |
| KR | 1020040014374 | 2/2004 |
| KR | 1020040040723 | 5/2004 |
| KR | 1020040098394 | 11/2004 |
| RU | 2192095 | 10/2002 |
| WO | 03015439 A1 | 2/2003 |
| WO | 2004039002 | 5/2004 |
| WO | 2004/064270 | 7/2004 |
| WO | 2004/064289 | 7/2004 |
| WO | 2004100447 A1 | 11/2004 |

* cited by examiner

*Primary Examiner* — Patrick N. Edouard
*Assistant Examiner* — Fred Casca
(74) *Attorney, Agent, or Firm* — Lee, Hong, Degerman, Kang & Waimey

(57) ABSTRACT

An apparatus and method of transmitting/receiving a multimedia broadcast/multicast service (MBMS) is disclosed. The present invention enables ARQ and HARQ to be applied to the MBMS transmission, thereby enabling more efficient data transmissions at a greater rate.

16 Claims, 25 Drawing Sheets

APPARATUS AND METHOD OF TRANSMITTING/RECEIVING MBMS

CROSS-REFERENCE TO RELATED APPLICATIONS

Pursuant to 35 U.S.C. §119(a), this application claims the benefit of earlier filing date and right of priority to Korean Application No. P05-012445, filed on Feb. 15, 2005, the contents of which is hereby incorporated by reference herein in its entirety:

BACKGROUND OF THE INVENTION

1. Field of the Invention

The present invention relates to a method and apparatus for transmitting and receiving a multimedia broadcast/multicast service (MBMS), and more particularly, to an apparatus and method for transmitting and receiving an MBMS using Automatic Repeat Request (ARC) and Hybrid Automatic Repeat Request (HARQ). Although the present invention is suitable for a wide scope of applications, it is particularly suitable for providing a multicast transmission using adaptive modulation and channel coding and Hybrid ARQ to a wireless mobile user equipment to enable the user equipment to receive high-speed multicast data.

2. Description of the Related Art

FIG. 1 illustrates a block diagram of a network structure of UMTS (Universal Mobile Telecommunications System). A UMTS includes user equipment (hereinafter abbreviated UE), a UMTS terrestrial radio access network (hereinafter abbreviated UTRAN), and a core network (hereinafter abbreviated CN).

The UTRAN includes at least one radio network sub-system (hereinafter abbreviated RNS). The RNS includes one radio network controller (hereinafter abbreviated RNC) and at least one base station (hereinafter called Node B) managed by the RNC. At least one or more cells exist in one Node B.

FIG. 2 illustrates an architectural diagram of a radio interface protocol between one UE and a UTRAN. A radio interface protocol vertically includes a physical layer, a data link layer, and a network layer and horizontally includes a user plane for data information transfer and a control plane for signaling transfer. The protocol layers in FIG. 2 can be divided into L1 (first layer), L2 (second layer) and L3 (third layer) based on three lower layers of the open system interconnection (OSI) standard model widely known in the communications systems.

The physical layer (hereinafter named PHY) offers information transfer services to an upper layer using physical channels. The physical layer is connected to a medium access control (hereinafter abbreviated MAC) layer above the physical layer via transport channels. Data are transferred between the MAC layer and the PHY layer via a transport channel. Data are transferred between different physical layers, and more specifically, between one physical layer of a transmitting side and the other physical layer of a receiving side via physical channels.

The MAC layer of the second layer offers services to a radio link control layer above the MAC layer via logical channels. The radio link control (hereinafter abbreviated RLC) layer of the second layer supports reliable data transfer and performs segmentation and concatenation of RLC service data units (hereinafter abbreviated SDU) sent down from an upper layer.

A radio resource control (hereinafter abbreviated RRC) layer located on a lowest part of the third layer is defined in the control plane only and is associated with configuration, reconfiguration and release of radio bearers (hereinafter abbreviated RB) for controlling the logical, transport and physical channels. A RB is a service offered to the second layer for the data transfer between the UE and the UTRAN. The configuration of a RB is a process of regulating characteristics of protocol layers and channels necessary for offering a specific service and a process of setting their specific parameters and operational methods, respectively.

A multimedia broadcast/multicast service (hereinafter abbreviated MBMS) offers a streaming or background service to a plurality of UEs using a downlink dedicated MBMS bearer service. One MBMS includes at least one session, and MBMS data are transmitted to a plurality of the UEs via the MBMS bearer service only during an ongoing session.

A UTRAN offers the MBMS bearer service to a UE via a radio bearer. The types of RB used by the UTRAN include a point-to-point radio bearer and a point-to-multipoint radio bearer. A point-to-point radio bearer is a bi-directional radio bearer and includes a logical channel DTCH (dedicated traffic channel), a transport channel DCH (dedicated channel) and a physical channel DPCH (dedicated physical channel) or a physical channel SCCPCH (secondary common control physical channel). A point-to-multipoint radio bearer is a unidirectional downlink radio bearer.

FIG. 3 illustrates channel mapping for MBMS. A point-to-multipoint radio bearer includes a logical channel MTCH (MBMS traffic channel), a transport channel FACH (forward access channel) and a physical channel SCCPCH. The logical channel MTCH is configured for each MBMS offered to one cell and is used in transmitting user-plane data of a specific MBMS to a plurality of UEs.

A logical channel MCCH (MBMS control channel) is a point-to-multipoint downlink channel used in transmitting control information associated with the MBMS. The logical channel MCCH is mapped to the transport channel FACH (forward access channel), while the transport channel FACH is mapped to the physical channel SCCPCH (secondary common control physical channel). One MCCH exists within one cell.

The UTRAN offering the MBMS transmits MCCH information to a plurality of UEs via the MCCH. The MCCH information includes a notification message associated with the MBMS, for example, an RRC message associated with the MBMS. The MCCH information may include a message that indicates MBMS information, a message that notifies point-to-multipoint radio bearer information or access information indicating that an RRC connection is requested for a specific MBMS.

FIG. 4 illustrates a transmission system of MCCH information. The MCCH information is periodically transmitted according to a modification period and a repetition period.

The MCCH information is divided into critical information and non-critical information. The non-critical information can be freely modified each modification period or each repetition period. The modification of the critical information can be made only each modification period. Specifically, the critical information is repeated one time each repetition period and the transmission of the modified critical information is possible at a start point of the modification period only.

The UTRAN periodically transmits a physical channel MICH (MBMS notification indicator channel) to indicate whether the MCCH information is updated during the modification period. Therefore, a UE attempting to receive only one specific MBMS does not receive the MCCH or MTCH until a session of the service begins, but receives MICH (MBMS notification indicator channel) periodically. For reference, the update of the MCCH information means a generation, addition, modification or removal of a specific item of the MCCH information.

FIG. 5 illustrates a flowchart of a process for executing an MBMS according to the related art. Once a session of a specific MBMS begins (S51), a UTRAN transmits an NI (notification indicator) to a UE attempting to receive a specific MBMS (S52). The NI indicates that an MCCH channel should be received. The UE, having received the NI via an MICH, receives an MCCH for a specific modification period indicated by the MICH.

A UE attempting to receive a specific MBMS using a point-to-multipoint radio bearer receives MCCH information including radio bearer information via an MCCH and then configures the point-to-multipoint radio bearer using the received information (S53). After completion of configuring the point-to-multipoint radio bearer, the UE keeps receiving a physical channel SCCPCH, to which an MTCH is mapped, in order to acquire data of the specific MBMS transmitted via the MTCH (S54). If a session ends (S55), the configured point-to-multipoint radio bearer is released (S56).

FIG. 6 illustrates a method of transmitting MBMS data discontinuously via MTCH. A UTRAN periodically transmits a scheduling message to a UE via an SCCPCH (SCCPH carrying MTCH) to which an MTCH is mapped. The scheduling message indicates a transmission start point and transmission section of MBMS data transmitted during one scheduling period. The UTRAN should previously inform the UE of a transmission period (scheduling period) of scheduling information.

The UE acquires the scheduling period from the UTRAN, receives the scheduling message periodically according to the acquired scheduling period, and then receives the SCCPCH (SCCPH carrying MTCH) to which the MTCH is mapped. The SCCPCH is received discontinuously and periodically using the received scheduling message. Specifically, the UE, using the scheduling message, receives the SCCPCH carrying the MTCH during a timing section for which the data is transmitted but does not receive the SCCPCH carrying the MTCH during a time section for which the data is not transmitted. The method is advantageous in that the UE can efficiently receive the data to reduce its battery consumption.

An HS-DSCH transmission of transmitting high-speed data in downlink to one UE is explained as follows.

An HS-DSCH has a 2 ms transmission time interval (hereinafter abbreviated TTI) (3 slot) and supports various modulation code sets (hereinafter abbreviated MCSs) for a high data rate. By selecting an MCS most suitable for a channel status, an optimal throughput is provided. HARQ is adopted to enable a reliable transmission. HARQ involves combining ARQ and channel coding.

FIG. 7 illustrates an HS-DSCH protocol stack according to the related art. A data unit delivered from an RLC layer of a serving radio network controller (hereinafter abbreviated SRNC) is delivered to an MAC-d entity managing a dedicated channel via a logical channel DTCH (dedicated traffic channel) or DCCH (dedicated control channel). The data unit is then passed through a MAC-c/sh/m of a controlling radio network controller (hereinafter abbreviated CRNC) to deliver the corresponding data to a MAC-hs of a Node B. The MAC-d is an entity that manages the dedicated channel. The MAC-c/sh/m is an entity that manages a common channel. The MAC-hs is a MAC entity that manages the HS-DSCH.

A physical channel HS-PDSCH is used for delivering the HS-DSCH, which is a transport channel. A spreading factor of the HS-PDSCH is fixed at 16 and the HS-PDSCH corresponds to one channelization code selected from a channelization code set prepared for a HS-DSCH data transmission. When performing a multi-code transmission for one UE, a plurality of channelization codes are assigned during the same HS-PDSCH sub-frame.

FIG. 8 illustrates a HS-DSCH sub-frame and slot according to the related art. A HS-PDSCH transfers QPSK (Quadrature Phase Shift Keying) or 16-QAM (Quadrature Amplitude Modulation) modulation symbols. In FIG. 8, "M" designates a bit number per modulation symbol. For QPSK, "M" is equal to 2 (M=2) and for 16-QAM, "M" is equal to 4 (M=4).

FIG. 9 illustrates a channel configuration according to the related art. A transmission of HS-DSCH control information is needed to transfer user data via an HS-DSCH. The information is transmitted via a downlink high-speed shared control channel (HS-SCCH). An uplink HS-DPCCH transfers uplink feedback signaling associated with a downlink HS-DSCH data transmission. A DPCH (dedicated physical channel) is a bi-directional physical channel to which a transport channel DCH is mapped. The DPCH is used to deliver dedicated data of a UE and L1 control information dedicated to a UE, such as a power control signal necessary for closed loop power control.

An F-DPCH (fractional dedicated physical channel) is a downlink channel for transferring several DPCHs using one channelization code. One F-DPCH does not transfer UE dedicated data for several UEs but rather is used to transfer UE-dedicated L1 control information for several UEs, such as the power control signal necessary for the closed loop power control. If the downlink F-DPCH exists, the downlink F-DPCH interfaces with an uplink DPCH. A plurality of UEs share the F-DPCH for use via one channel code. Each of the UEs is provided with an uplink DPCH.

FIG. 10 is a structural diagram of a sub-frame of HS-PDSCH according to the related art. A downlink HS-SCCH is a downlink physical channel transferred with a spreading factor set to 128 such that the data rate is 60 kbps. Information transferred over the downlink HS-SCCH can be classified into transport format and resource related information (hereinafter abbreviated TFRI) and HARQ related information. UE identity (H-RNTI) information, which indicates to which user the corresponding information belongs, is masked for transfer.

FIG. 11 is a flowchart of an HS-SCCH coding method according to the related art. HS-SCCH information for HS-SCCH coding is illustrated in Table TBD. HARQ and UE ID information is illustrated in Table II.

TABLE I

Channelization-code-set information (7 bits): xccs 1, xccs 2, ..., xccs 7
Modulation scheme information (1 bit): xms 1
Transport-block size information (6 bits): xtbs 1, xtbs 2, ..., xtbs 6

TABLE II

Hybrid-ARQ process information (3 bits): xhap 1, xhap 2, xhap 3
Redundancy and constellation version (3 bits): xrv 1, xrv 2, xrv 3
New data indicator (1 bit): xnd 1
UE identity (16 bits): xue 1, xue 2, ..., xue 16

FIG. 12 is a structural diagram of a frame of uplink HS-DPCCH according to the related art. An uplink HS-DPCCH transfers uplink feedback signaling associated with a downlink HS-DSCH data transmission.

The HS-DPCCH is a channel dedicated to a specific UE and interfaces with an uplink DPCH (dedicated physical channel) and a downlink DPCH (dedicated physical channel).

The feedback signaling includes ACK (acknowledgement) or NACK (negative acknowledgement) information for HARQ and a CQI (channel quality indicator). A frame of the HS-DPCCH includes five sub-frames, each of which has a length of 2 ms. Each of the sub-frames includes three slots.

The ACK/NACK information for HARQ is transmitted for a first slot of the HS-DPCCH sub-frame. The CQI is transmitted for second and third slots of the HS-DSCH sub-frame.

The HS-DPCCH is always transmitted together with UL DPCCH. The CQI delivers status information of a downlink radio channel. The status information is obtained from a measurement of a downlink CPICH (common pilot channel) by a UE. The ACK/NACK indicates the ACK or NACK information for a user data packet transmission transmitted over a downlink HS-DSCH by the HARQ mechanism.

However, related art methods provide a maximum data rate for MBMS of only 256 Kbps, which corresponds to a maximum speed of one SCCPCH. Therefore, the related art methods are unable to provide an MBMS having a data rate greater than 256 Kbps. Furthermore, since an uplink channel for the MBMS is not provided, related art systems are unable to deliver information (ACK or NACK) in response to the MBMS transmission.

Therefore, there is a need for an apparatus and method to provide MBMS at a data rate greater than 256 Kbps and allow ACK/NACK information to be provided in response to the MBMS transmission. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide a multimedia broadcast/multicast service (MBMS) at a data rate greater than 256 Kbps and allow ACK/NACK information to be provided in response to the MBMS transmission. An object of the present invention is to provide an apparatus and method for transmitting and receiving an MBMS, by which adaptive modulation and coding and HARQ can be used in performing a high-speed multimedia broadcast/multicast service.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in receiving an MBMS by a mobile subscriber station storing a generic mobile subscriber station identity and at least one multimedia broadcast/multicast service (MBMS) identity, a method of receiving the multimedia broadcast/multicast service (MBMS) according to the present invention includes the steps of receiving at least one of the mobile subscriber station identity and the multicast service identity via a control channel, comparing the stored mobile subscriber station identity and the stored multicast service identity to the received mobile subscriber station identity or the multicast service identity, and if at least one of the stored identities matches at least one of the received identities, receiving a frame of a data corresponding to a specific frame of the control channel.

Preferably, the control channel is a downlink high speed-shared control channel (HS-SCCH).

Preferably, the data channel is a high-speed physical downlink shared channel (HS-PDSCH).

Preferably, the method further includes the steps of decoding the received frame of the data and transmitting control information including a response signal (ACK/NACK) according to a result of the decoding step via an uplink control channel. More preferably, data received via the frame of the data channel are either mobile subscriber station dedicated data or multicast data. More preferably, the control information further includes downlink channel quality information.

More preferably, the control information is transmitted via a sub-frame of a high speed-downlink physical channel (HS-DPCCH).

In another aspect of the present invention, in transmitting a multimedia broadcast/multicast service (MBMS) to at least one mobile subscriber station, each storing a generic mobile subscriber station identity and at least one multimedia broadcast/multicast service (MBMS) identity, a method of transmitting the multimedia broadcast/multicast service (MBMS) includes the steps of transmitting a multimedia broadcast/multicast identity via a control channel, transmitting data corresponding to the multimedia broadcast/multicast identity, receiving control information including information indicating a success or failure in decoding the data from the at least one mobile subscriber station, and selecting one of the at least one mobile subscriber stations to which a retransmission shall be performed.

Preferably, the method further includes the steps of transmitting a multimedia broadcast/multicast identity to the selected mobile subscriber station via the control channel and transmitting data corresponding to the multimedia broadcast/multicast identity.

More preferably, the control channel is a downlink high speed-shared control channel (HS-SCCH). More preferably, the data is transmitted via a sub-frame of a high speed-physical downlink shared channel (HS-PDSCH).

More preferably, the control information further includes downlink channel quality information.

In another aspect of the present invention a network and mobile communication terminal apparatus is provided that are adapted to implement the methods of the present invention.

It is to be understood that both the foregoing general description and the following detailed description of the present invention are exemplary and explanatory and are intended to provide further explanation of the invention as claimed.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention relates to an apparatus and method for transmitting and receiving MBMS information. Although the present invention is illustrated with respect to a mobile communication device, it is contemplated that the present invention may be utilized anytime it is desired to transmit a service to one or more users.

Reference will now be made in detail to the preferred embodiments of the present invention, examples of which are illustrated in the accompanying drawings. Wherever possible, the same reference numbers will be used throughout the drawings to refer to the same or like parts.

Figure 1:
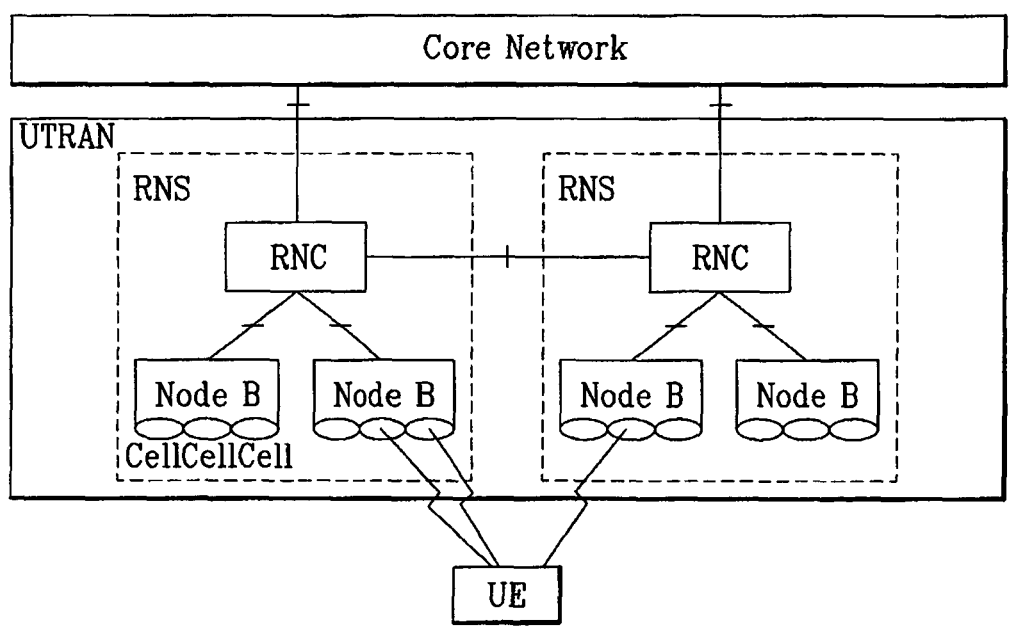
FIG. 1 is a block diagram of a network structure of a conventional UMTS.
Figure 2:
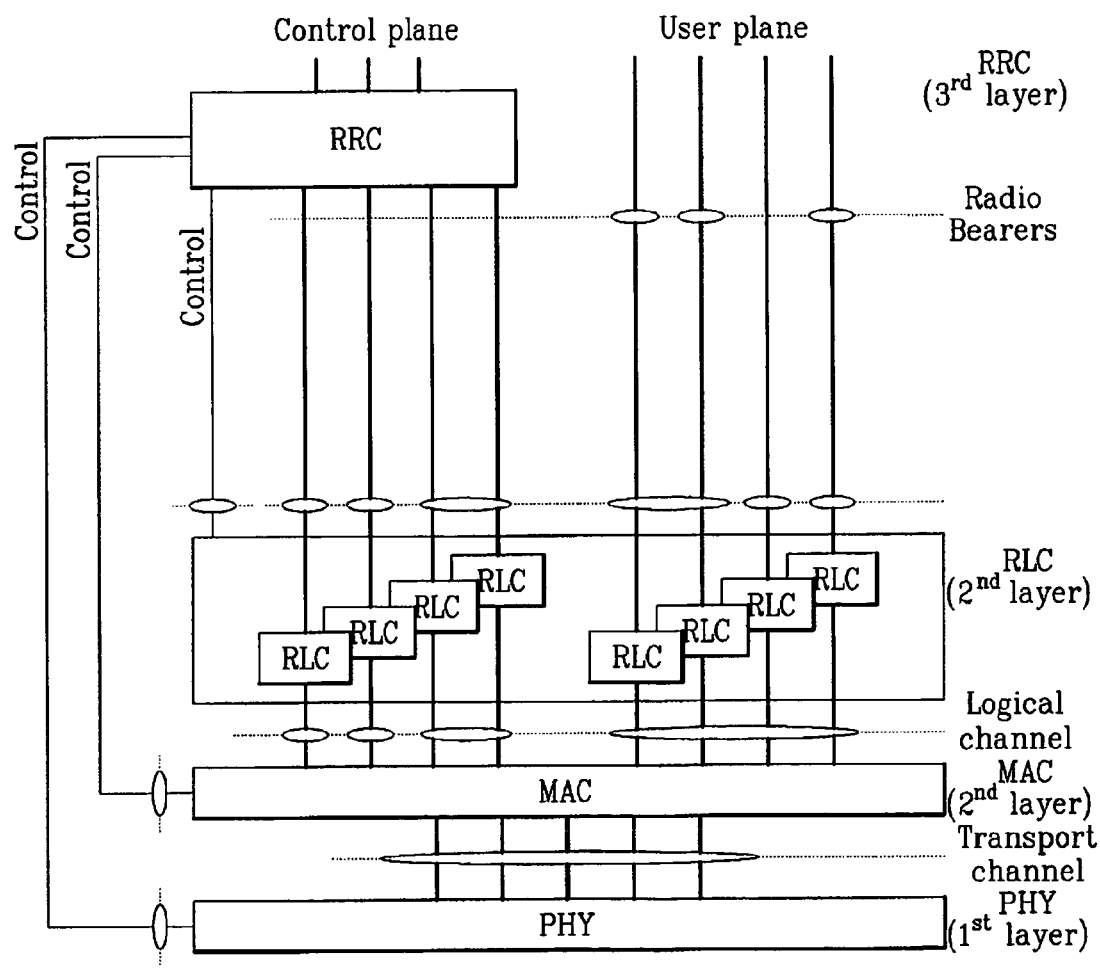
FIG. 2 illustrates a structure of a radio interface protocol between a conventional UE and UTRAN.
Figure 3:
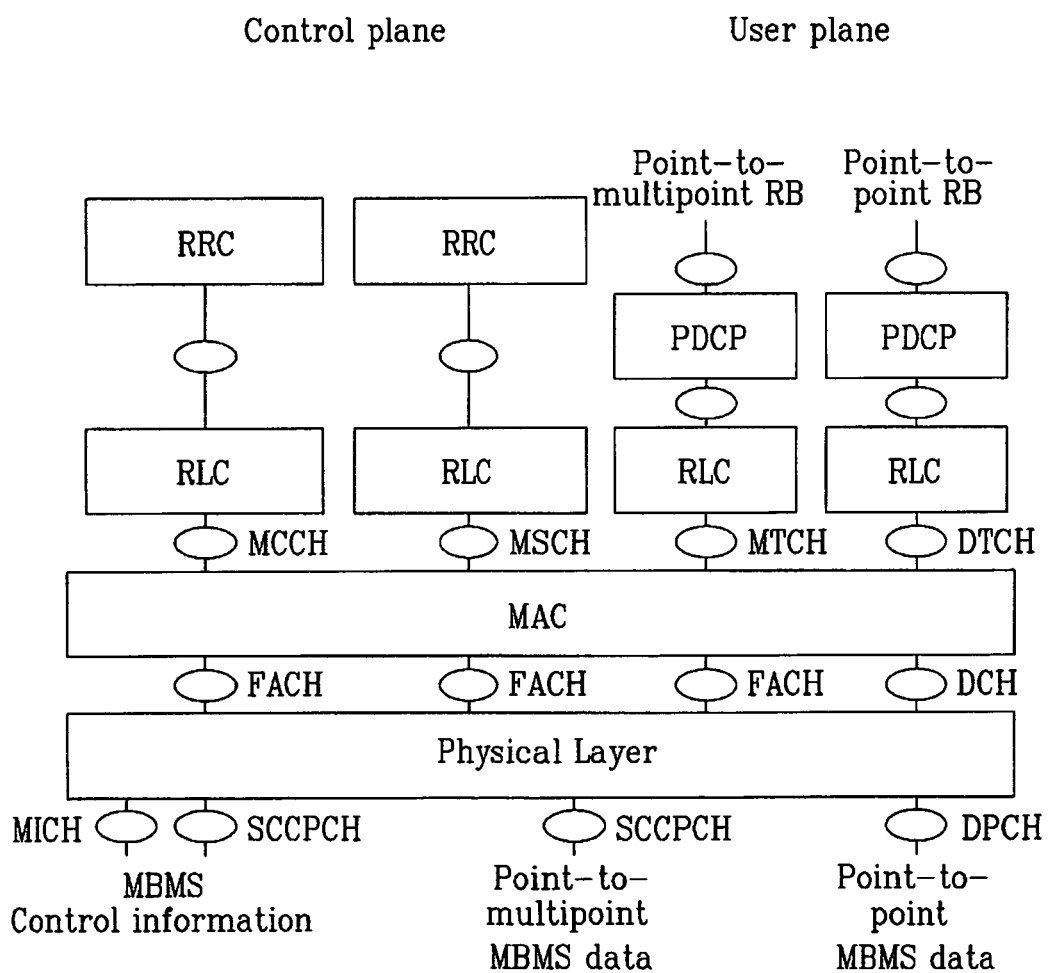
FIG. 3 is a diagram illustrating channel mapping for a conventional MBMS.
Figure 4:
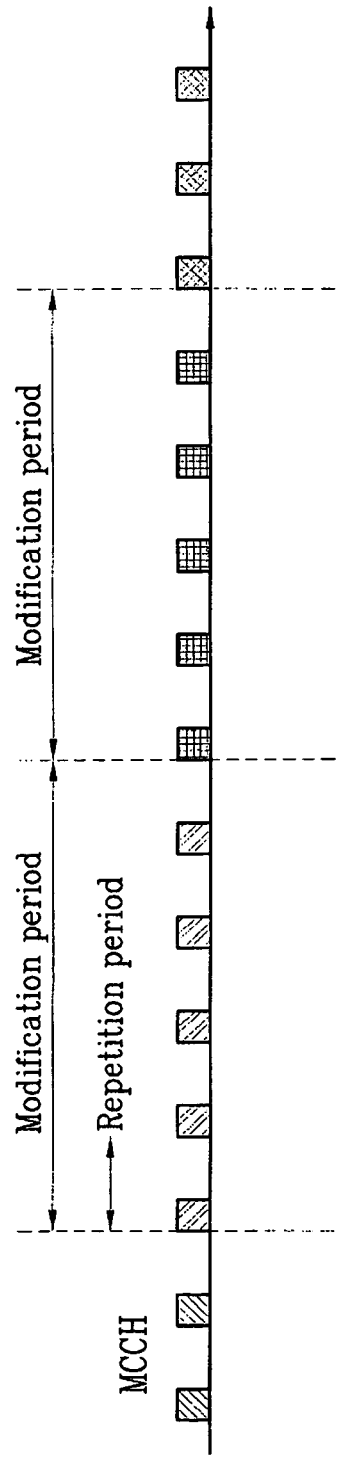
FIG. 4 is a diagram illustrating a transmission of MCCH information for a conventional MBMS data transmission.
Figure 5:
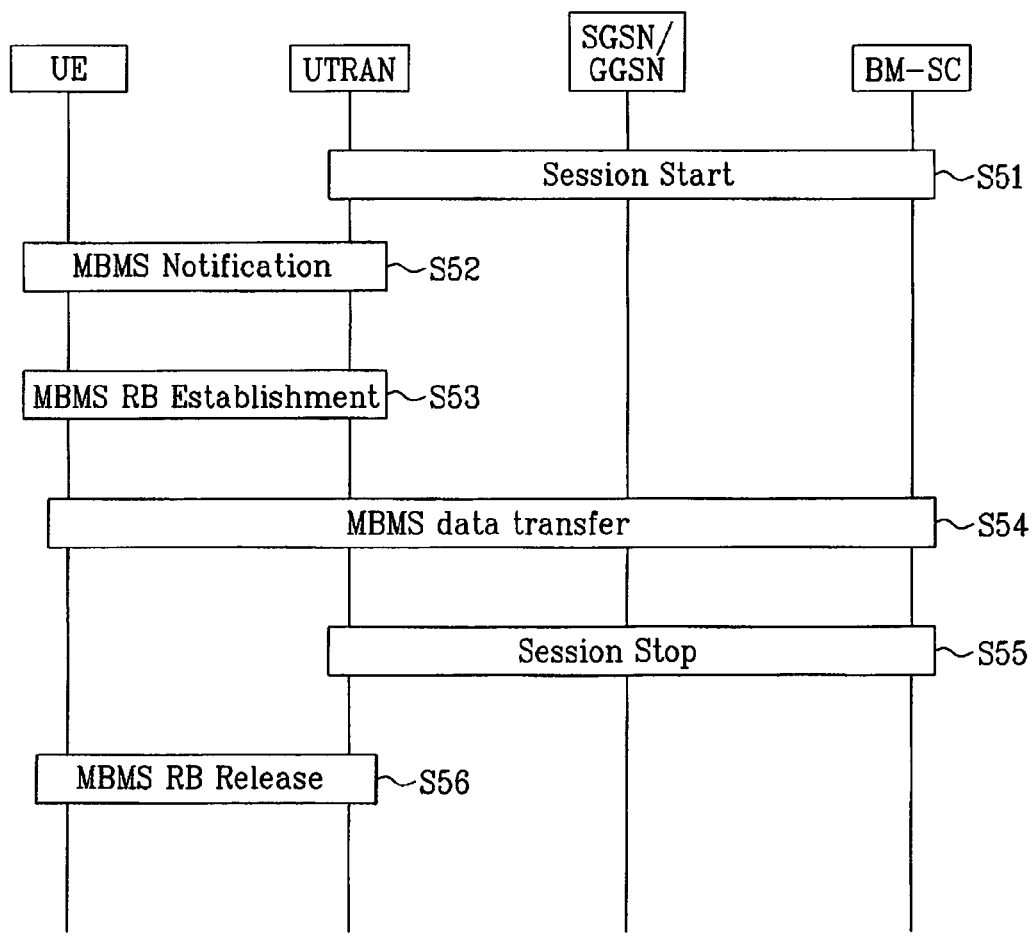
FIG. 5 is a flowchart of a process of executing a conventional MBMS.
Figure 6:
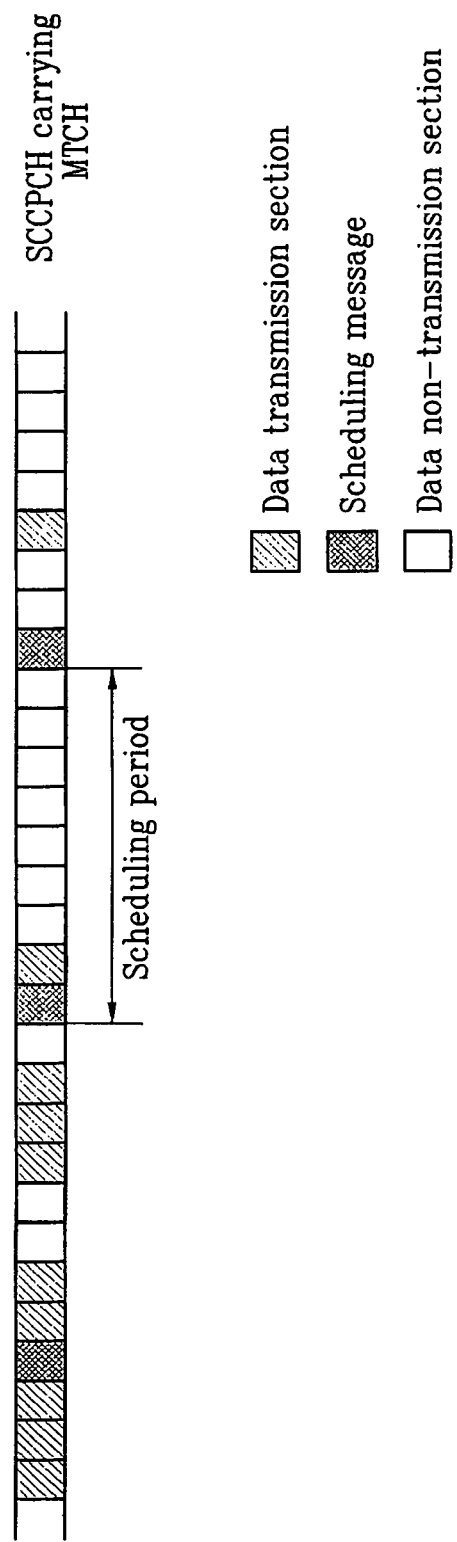
FIG. 6 is a diagram illustrating a conventional method of transmitting MBMS data discontinuously via MTCH.
Figure 7:
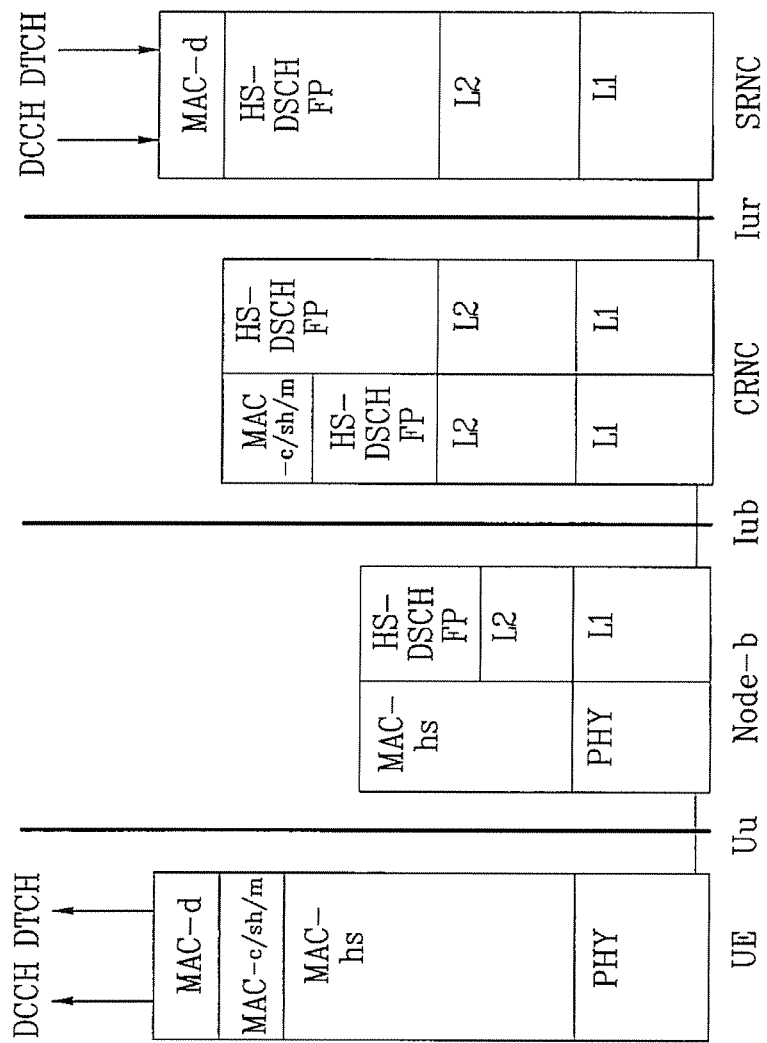
FIG. 7 illustrates a conventional HS-DSCH protocol stack.
Figure 8:
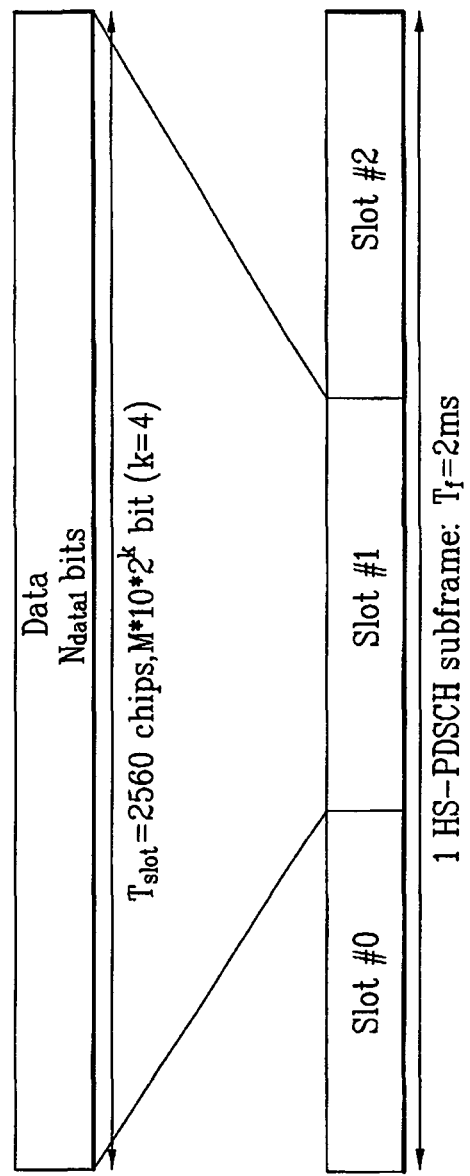
FIG. 8 illustrates a conventional HS-DSCH sub-frame and slot.
Figure 9:
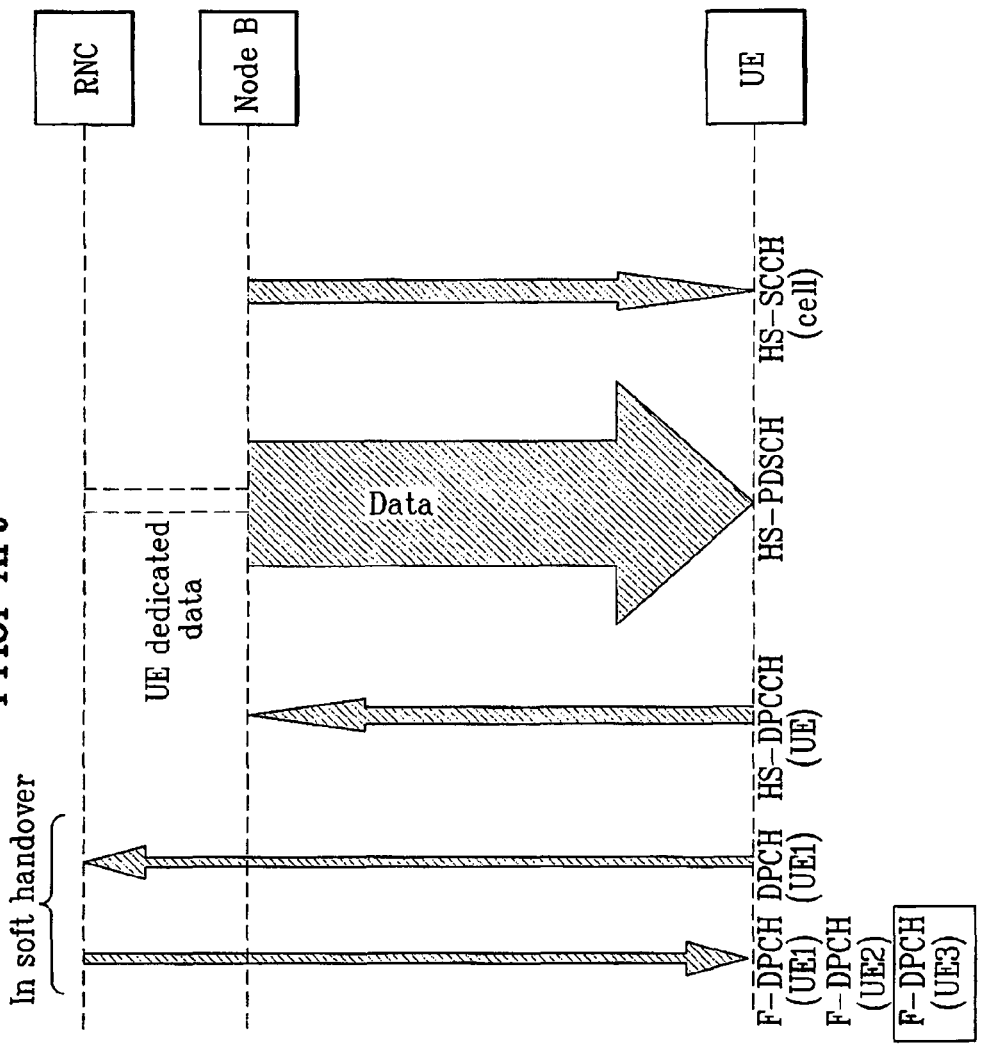
FIG. 9 illustrates a conventional channel configuration.
Figure 10:
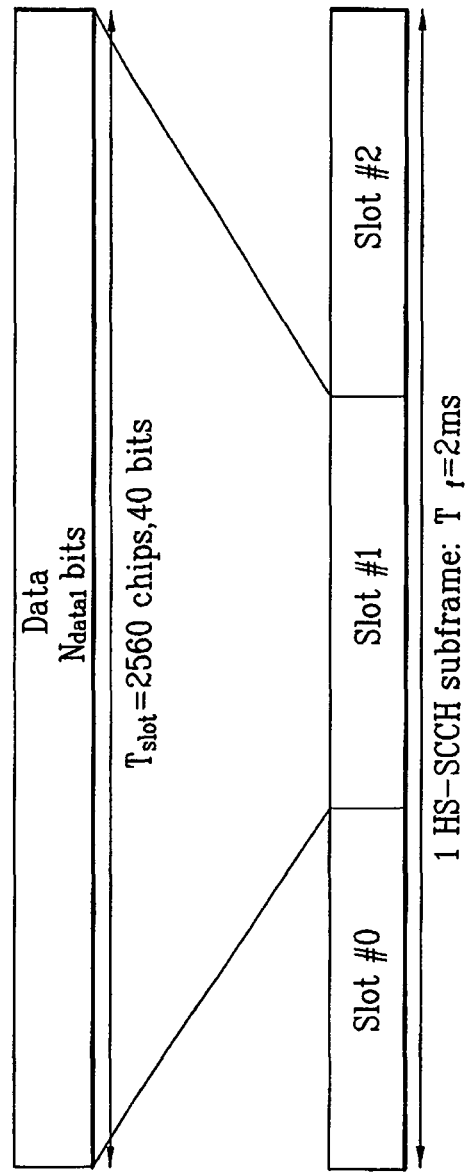
FIG. 10 is a structural diagram of a conventional sub-frame of HS-SCCH.
Figure 11:
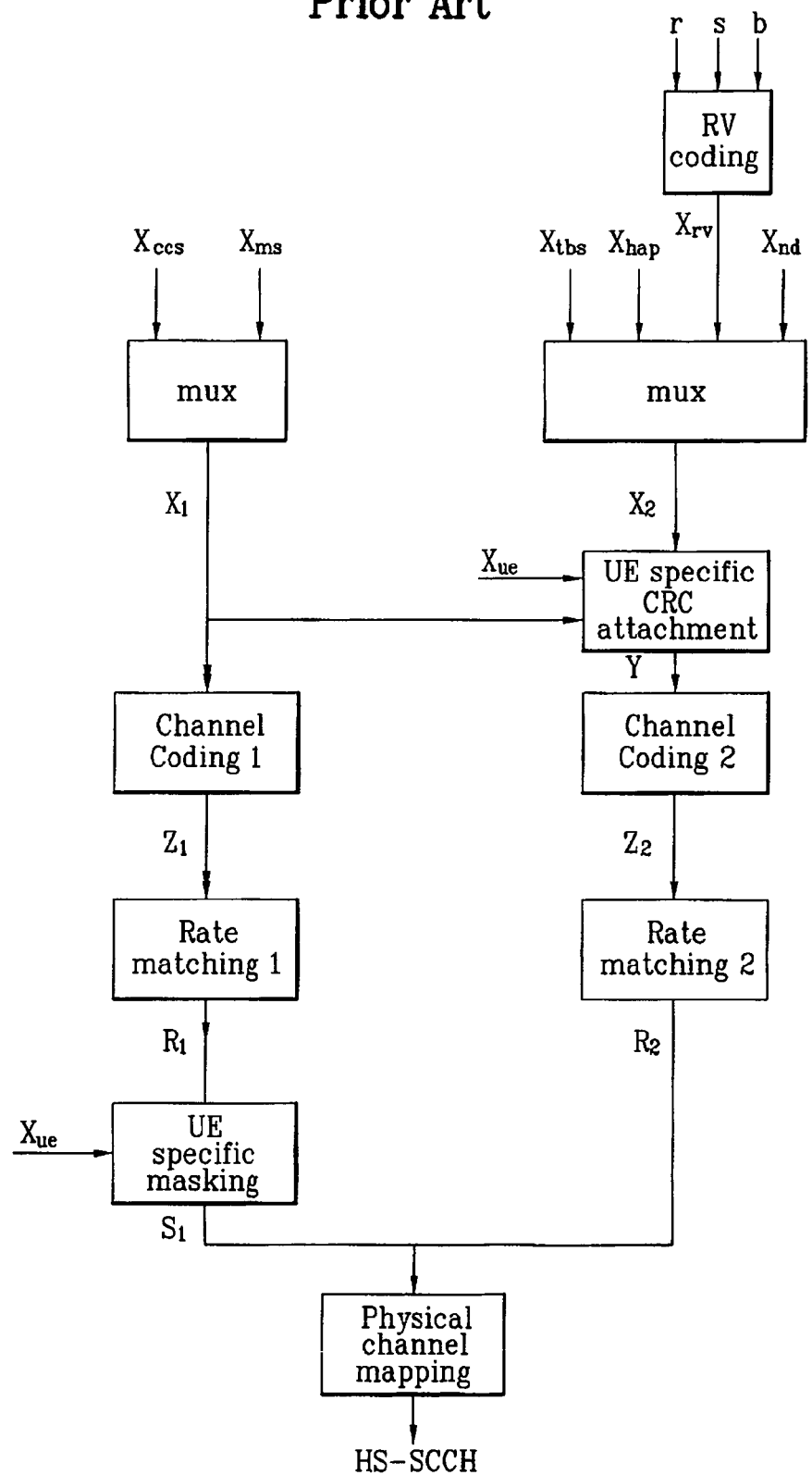
FIG. 11 is a flowchart of a conventional HS-SCCH coding method.
Figure 12:
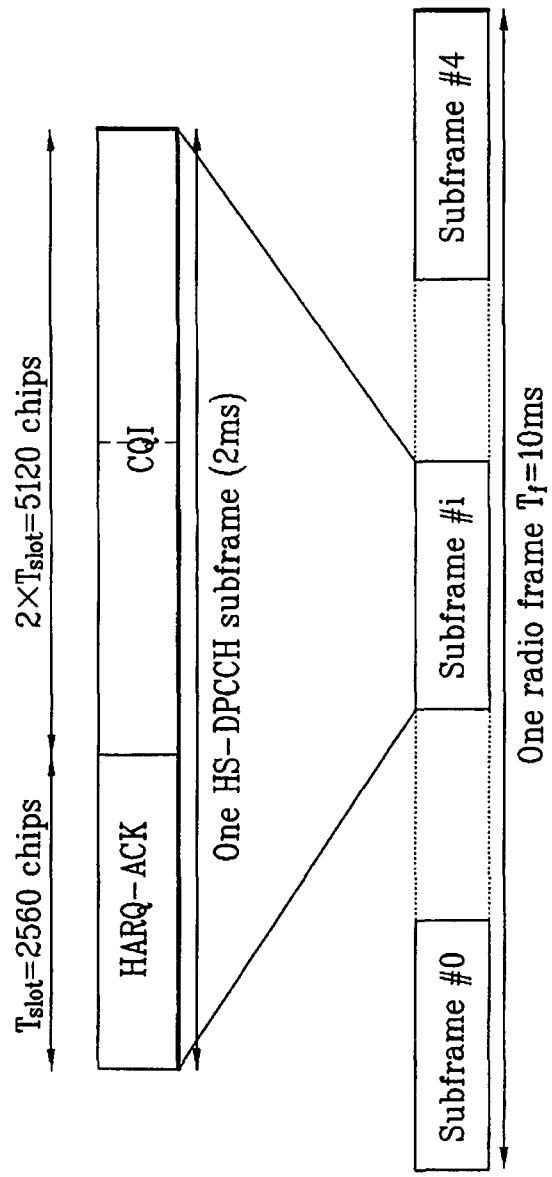
FIG. 12 is a structural diagram of a frame of a conventional uplink HS-DPCCH.
Figure 13:
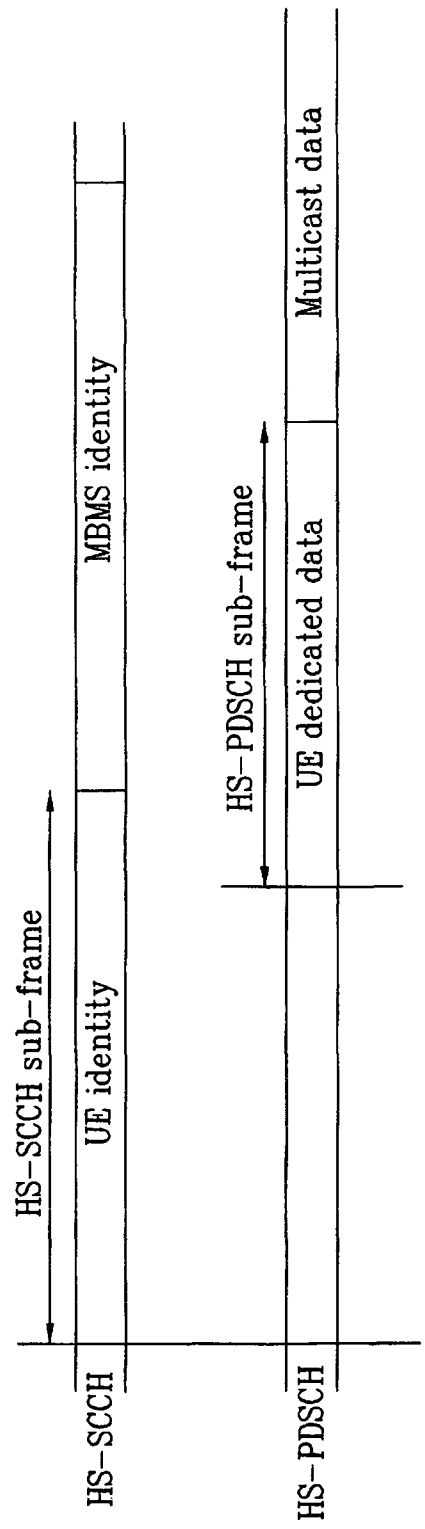
FIG. 13 is a diagram illustrating an example of a data transmission via HS-SCCH and HS-PDSCH according to one embodiment of the present invention.

FIG. 13 is a diagram illustrating an example of a data transmission via HS-SCCH and HS-PDSCH. The HS-PDSCH (high speed-physical downlink shared channel) can transmit a UE dedicated data unit for a specific UE or a multicast data unit for one or more UEs subscribed to a specific multicast service for each sub-frame. The UE dedicated data unit is a logical channel DTCH or DCCH data unit and the multicast data unit is a logical channel MTCH, MCCH or MSCH data unit.

If the UE dedicated data unit is transmitted for the HS-PDSCH sub-frame, a mapped HS-SCCH sub-frame transmits a UE identity allocated to the UE. If the multicast data unit is transmitted for the HS-PDSCH sub-frame, the mapped HS-SCCH sub-frame transmits an MBMS identity allocated to the multicast service.

Referring to FIG. 13, an MBMS identity is an identity of a specific MBMS allocated by a CN or an RRC of a UTRAN. The MBMS identity is an MBMS transmission identity or an MBMS-Id.

The MBMS identity is an identity allocated by the CN to identify a specific MBMS. The MBMS transmission identity includes an MBMS identity and an MBMS session identity.

The MBMS session identity is an identity that identifies a specific session of a specific MBMS. The MBMS-id is a service identity allocated by the UTRAN and is an MBMS identity included in a MAC header of an MTCH.

The MBMS identity can be replaced by a UE group identity. The UE group identity is an identity that identifies a UE group consisting of one or more UEs attempting to receive the same data.

Figure 14:
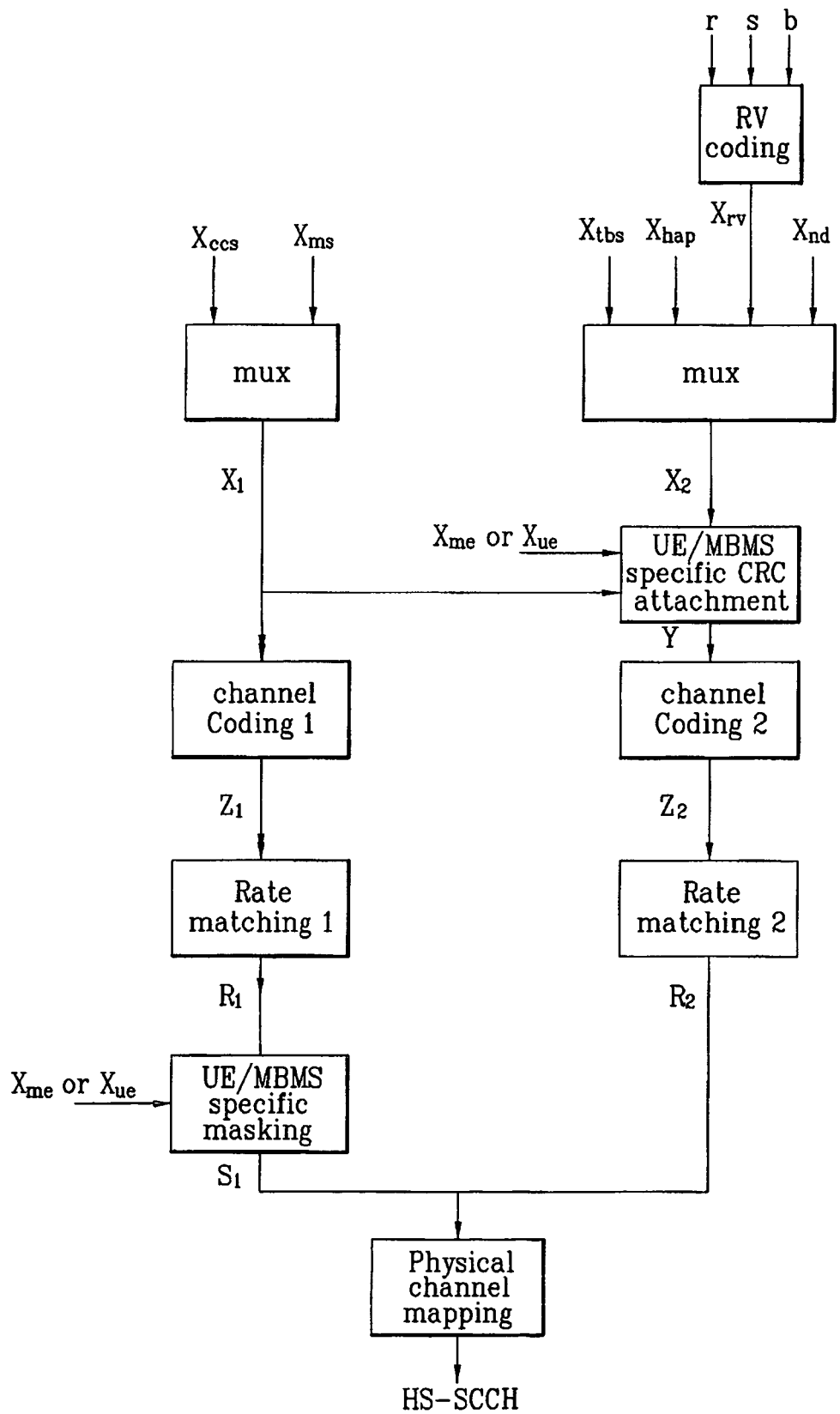
FIG. 14 is an exemplary flowchart of an HS-SCCH coding method according to one embodiment of the present invention.

FIG. 14 illustrates HS-SCCH information for an HS-SCCH coding method. The TFRI information is listed in Table III. The HARQ information listed in Table IV. The UE ID information listed in Table V.

TABLE III

Channelization-code-set information (7 bits): xccs 1, xccs 2, ..., xccs 7
Modulation scheme information (1 bit): xms 1
Transport-block size information (6 bits): xtbs 1, xtbs 2, ..., xtbs 6

TABLE IV

Hybrid-ARQ process information (3 bits): xhap 1, xhap 2, xhap 3
Redundancy and constellation version (3 bits): xrv 1, xrv 2, xrv 3
New data indicator (1 bit): xnd 1

TABLE V

UE identity (16 bits): xue 1, xue 2, ..., xue 16
MBMS identity (16 bits): xme 1, xme 2, ..., xme 16

An MBMS identity or UE identity, as shown in FIG. 14, is encoded in a CRC (Cyclic Redundancy Check) attachment and masking is according to a type of data to be transmitted. A UE attempting to receive multicast data via HS-DSCH should be provided with both the UE identity and the MBMS identity.

Figure 15:
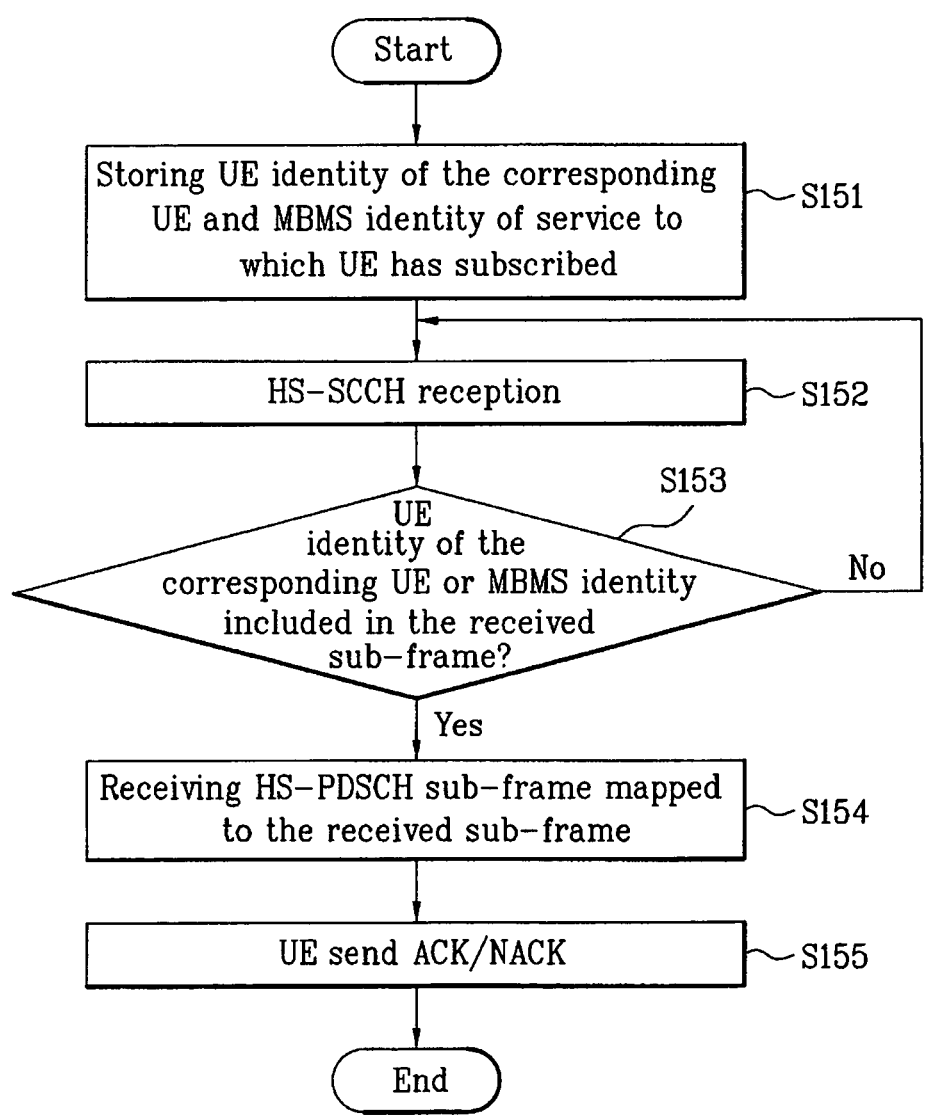
FIG. 15 is an exemplary flowchart of a UE operation according to HS-SCCH and HS-PDSCH transmission according to one embodiment of the present invention.

FIG. 15 illustrates a flowchart of UE operation according to HS-SCCH and HS-PDSCH transmission. A UE stores its UE identity. If there is at least one service that the UE attempts to receive, the UE also stores the MBMS identities corresponding to the services (S151). The UE receives an HS-SCCH (S152) and acquires identity information from a sub-frame of the received HS-SCCH (S153). The UE checks whether the acquired identity is identical to the UE or MBMS identity it has stored.

If there is no match, the UE again receives the next HS-SCCH (S152) and re-acquires identity information from a sub-frame of the received HS-SCCH (S153). If there is a match, the UE receives an HS-PDSCH sub-frame mapped to the sub-frame of the received HS-SCCH (S154). The UE transmits a response signal to indicate the reception of the HS-PDSCH sub-frame either without errors (ACK) or with errors (NACK) (S155).

Figure 16:
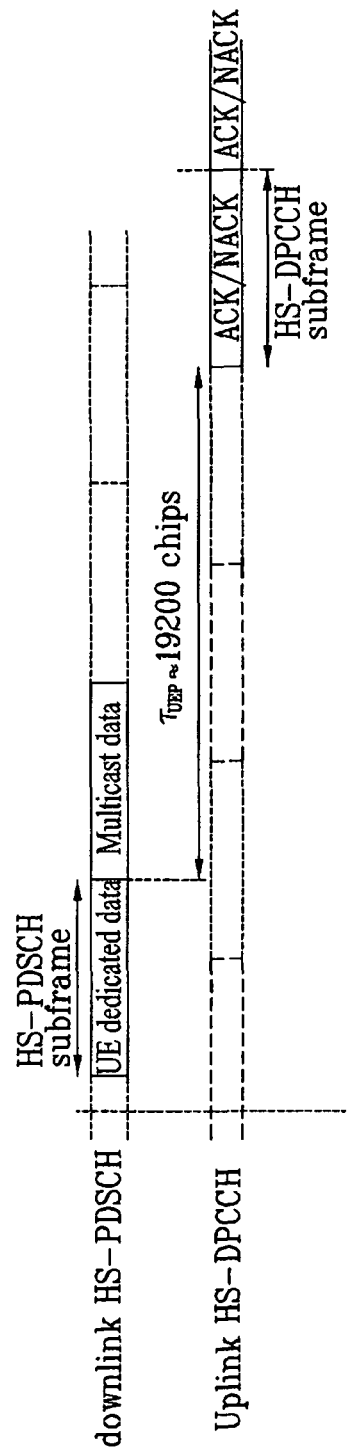
FIG. 16 illustrates an HS-DSCH transmission according to one embodiment of the present invention.

FIG. 16 illustrates an HS-DSCH transmission according to one embodiment of the present invention. A multicast transmission via HS-PDSCH according to the present invention is explained according to FIG. 16.

The HS-PDSCH transmits UE dedicated data for a specific UE or multicast data for one or more UEs subscribed to a specific multicast service for each sub-frame. A UE then transmits a signal in response to the data transmissions via a sub-frame of an HS-DPCCH mapped to the HS-PDSCH sub-frame. Each of the sub-frames delivers a response signal for the UE dedicated data or for the multicast data according to a type of the received data. The response signal is ACK or NACK.

Upon decoding the received data, an ACK response is transmitted if the data is received without error. If an error occurs, an NACK response is transmitted. The sub-frame of the HS-DPCCH can transmit CQI (channel quality indicator) information together with the ACK or NACK signal.

Figure 17:
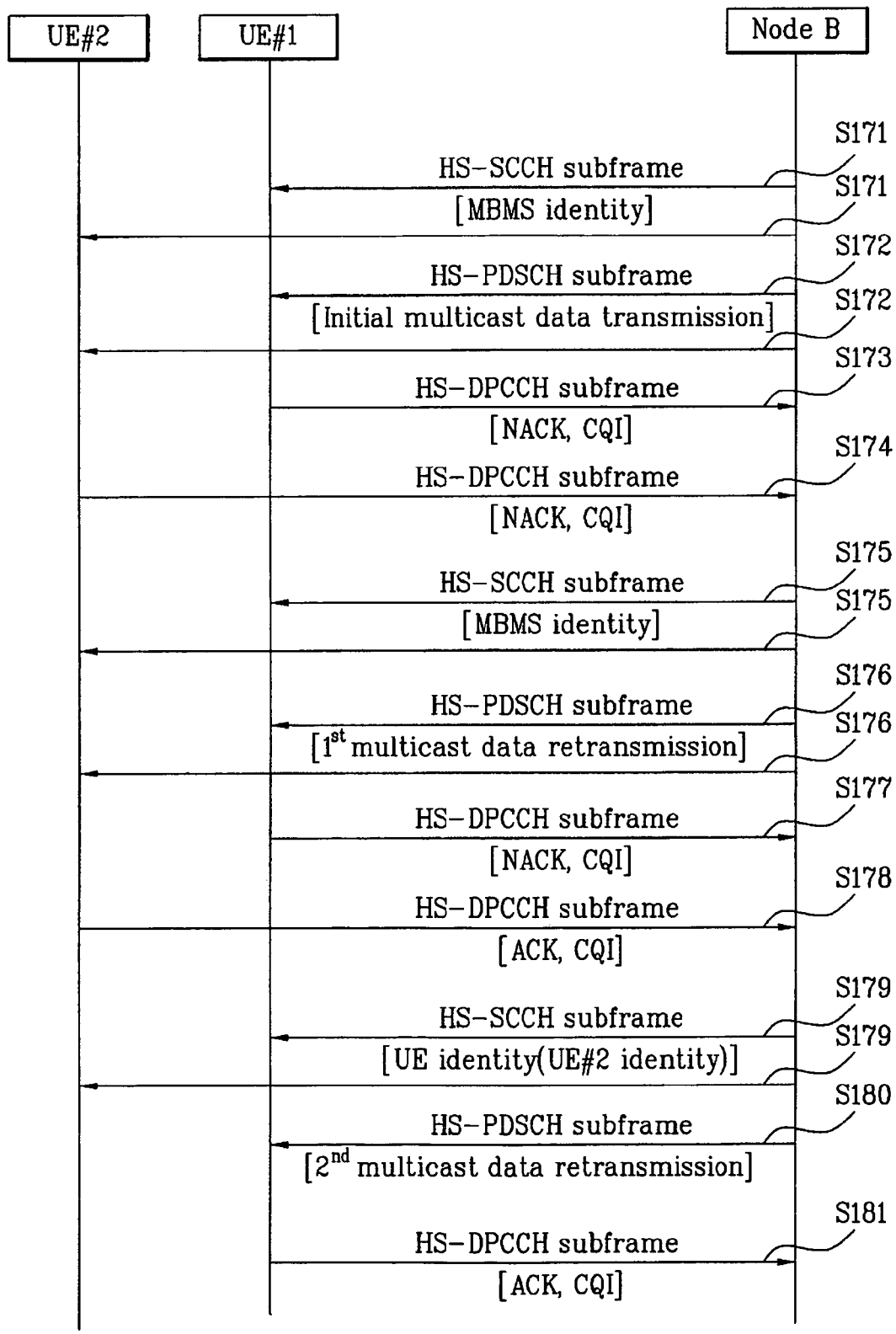
FIG. 17 is a flowchart of a multicast retransmission method according to one embodiment of the present invention.

FIG. 17 illustrates a flowchart of a multicast retransmission method according to one embodiment of the present invention. Each of a plurality of UEs (UE#1, UE#2) attempting to receive a specific MBMS receives an HS-SCCH sub-frame in order to acquire an MBMS identity (S171). If the acquired identity is the MBMS corresponds to a service to which a UE has subscribed, the UE receives a corresponding HS-PDSCH sub-frame to acquire multicast data (S172).

A first UE (UE#1) transmits ACK or NACK information for the received multicast data via HS-DPCCH after receiving the HS-PDSCH sub-frame (S173). The first UE (UE#1) can periodically transmit CQI information. As illustrated in FIG. 17, NACK information is transmitted since errors occur in the received data.

A second UE (UE#2) transmits ACK or NACK information for the received multicast data via HS-DPCCH after receiving the HS-PDSCH sub-frame (S174). The second UE (UE#2) can periodically transmit CQI information. As illustrated in FIG. 17, NACK information is transmitted since errors occur in the received data.

If a number of UEs exceeding a threshold value transmit NACK, a Node B retransmits the data to a plurality of UEs using an MBMS identity and then retransmits the BMS identity via the HS-SCCH (S175). Each of the plurality of UEs receives the HS-SCCH sub-frame and acquires the MBMS identity. If the acquired MBMS identity corresponds to a service to which a UE has subscribed, the UE receives the corresponding HS-PDSCH sub-frame (S176) to acquire the multicast data.

The first UE (UE#1) transmits ACK or NACK information for the received multicast data via the HS-DPCCH after receiving the HS-PDSCH sub-frame (S177). The first UE (UE#1) can periodically transmit CQI information. As illustrated in FIG. 17, NACK information is transmitted since errors occur in the received data.

The second UE (UE#2) transmits ACK or NACK information for the received multicast data via HS-DPCCH after receiving the HS-PDSCH sub-frame (S178). The second UE (UE#2) can periodically transmit CQI information. As illustrated in FIG. 17, ACK information is transmitted since no errors occur in the received data.

If a number of UEs not exceeding the threshold value have transmitted NACK, the Node B retransmits the data unit to only the UE(s) that failed to receive the data unit without errors. The Node B also transmits an identity of each of the UEs that failed to receive the data unit without errors over a different HS-SCCH sub-frame.

The UEs corresponding to the transmitted identities receive the HS-SCCH sub-frame and acquire the UE identity (S179). For a specific UE, if the acquired identity corresponds to the UE's identity, the UE receives the corresponding HS-PDSCH sub-frame and acquires the multicast data (S180) and, if the acquired identity does not correspond to the UE's identity, the UE does not receive the corresponding HS-PDSCH sub-frame.

The first UE (UE#1) transmits ACK or NACK information for the received multicast data via the HS-DPCCH after receiving the HS-PDSCH sub-frame (S181). The first UE (UE#1) can periodically transmit CQI information. As illustrated in FIG. 17, ACK information is transmitted since no errors occur in the received data.

Figure 18:
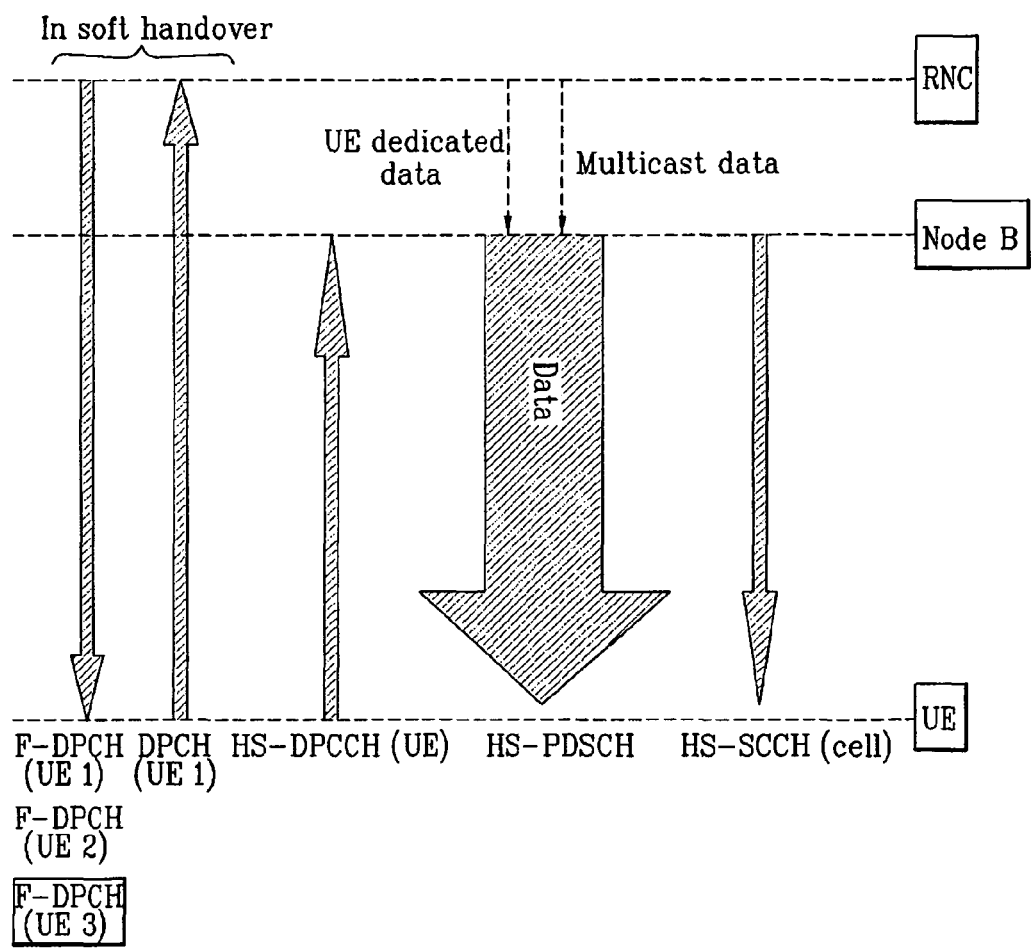
FIG. 18 illustrates a channel for a multicast data transmission according to one embodiment of the present invention.

FIG. 18 illustrates a channel for a multicast data transmission according to one embodiment of the present invention. An F-DPCH is shared by a plurality of UEs having subscribed to a multicast service in order to transmit UE dedicated power control signals. The F-DPCH interfaces with several uplink DPCHs set for each of the UEs in order to perform the power control. As illustrated in FIG. 18, power of HS-DPCCH is adjusted according to the uplink DPCH.

Figure 19:
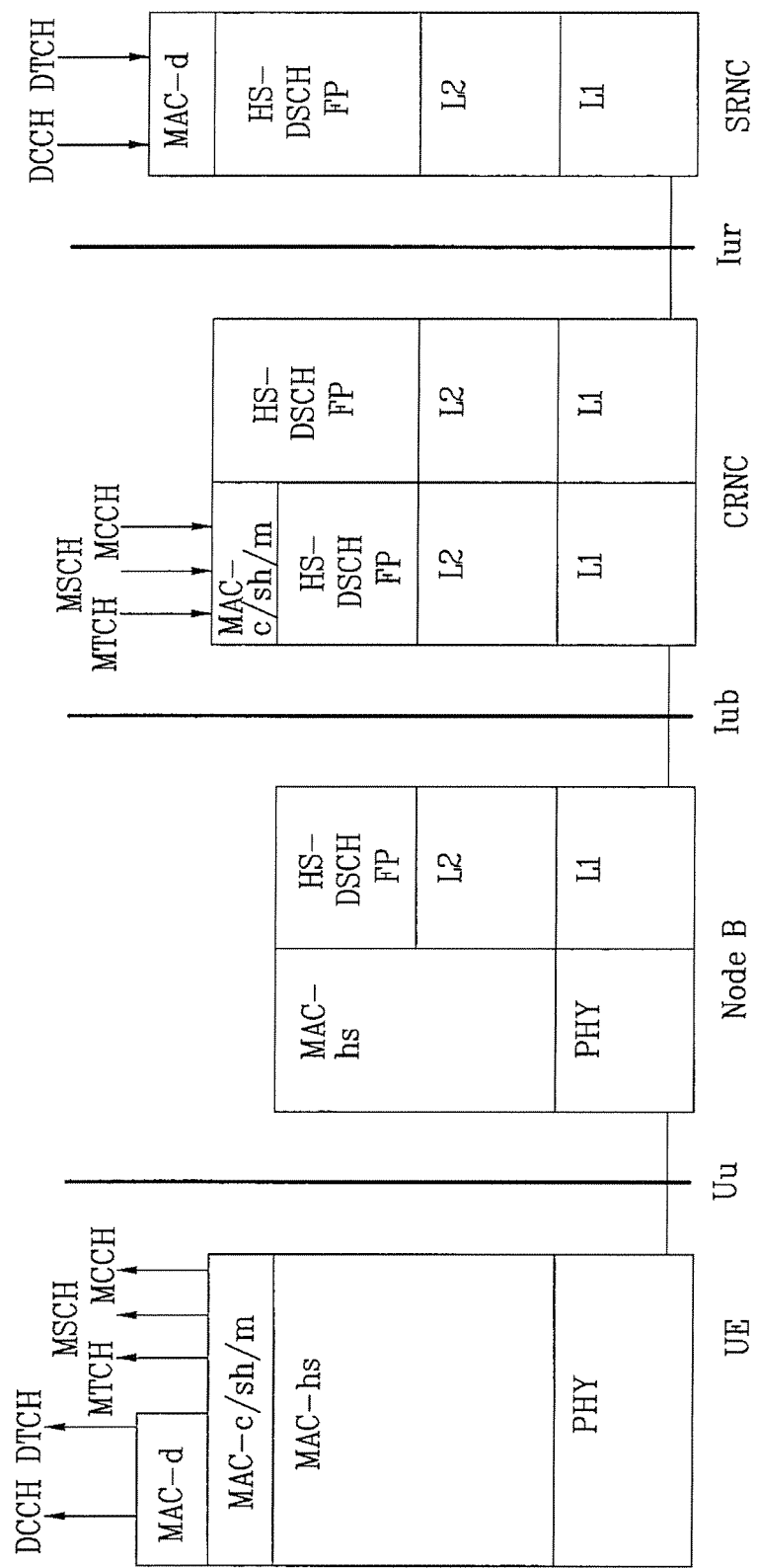
FIG. 19 illustrates an HS-DSCH protocol stack according to one embodiment of the present invention.

FIG. 19 illustrates an HS-DSCH protocol stack according to one embodiment of the present invention. A channel associated with an MBMS, such as MTCH, MSCH or MCCH, is mapped to an HS-DSCH in a CRNC so that MBMS control information or MBMS data can be transmitted to a UE via an HS-PDSCH.

Figure 20:
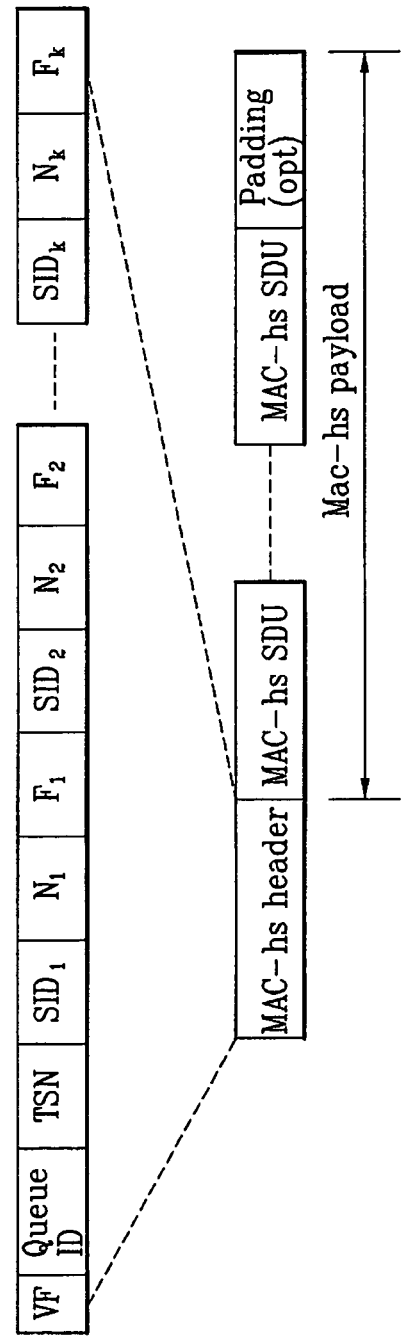
FIG. 20 illustrates an MAC PDU of HS-DSCH according to one embodiment of the present invention.

FIG. 20 illustrates an MAC PDU (protocol data unit) of HS-DSCH according to one embodiment of the present invention. A MAC-hs SDU (service data unit) corresponds to a MAC-c/sh/m PDU.

For an MTCH, the MAC-c/sh/m PDU includes a TCTF (target channel type field), an MBMS-Id and a MAC SDU or includes only a MAC SDU. For an MCCH or MSCH, the MAC-c/sh/m PDU includes a TCTF and a MAC SDU or includes only a MAC SDU.

The MAC SDU corresponds to an RLC PDU. A first bit of VF is set to 0 for a DTCH/DCCH transmission or to 1 for an MTCH/MCCH/MSCH transmission. The VF can be set to 1-bit or 2-bit. If the first bit of the VF is set to 1, a UE MAC recognizes the MAC PDU as multicast data that is delivered to an upper RLC via the MTCH, MCCH or MSCH.

Figure 21:
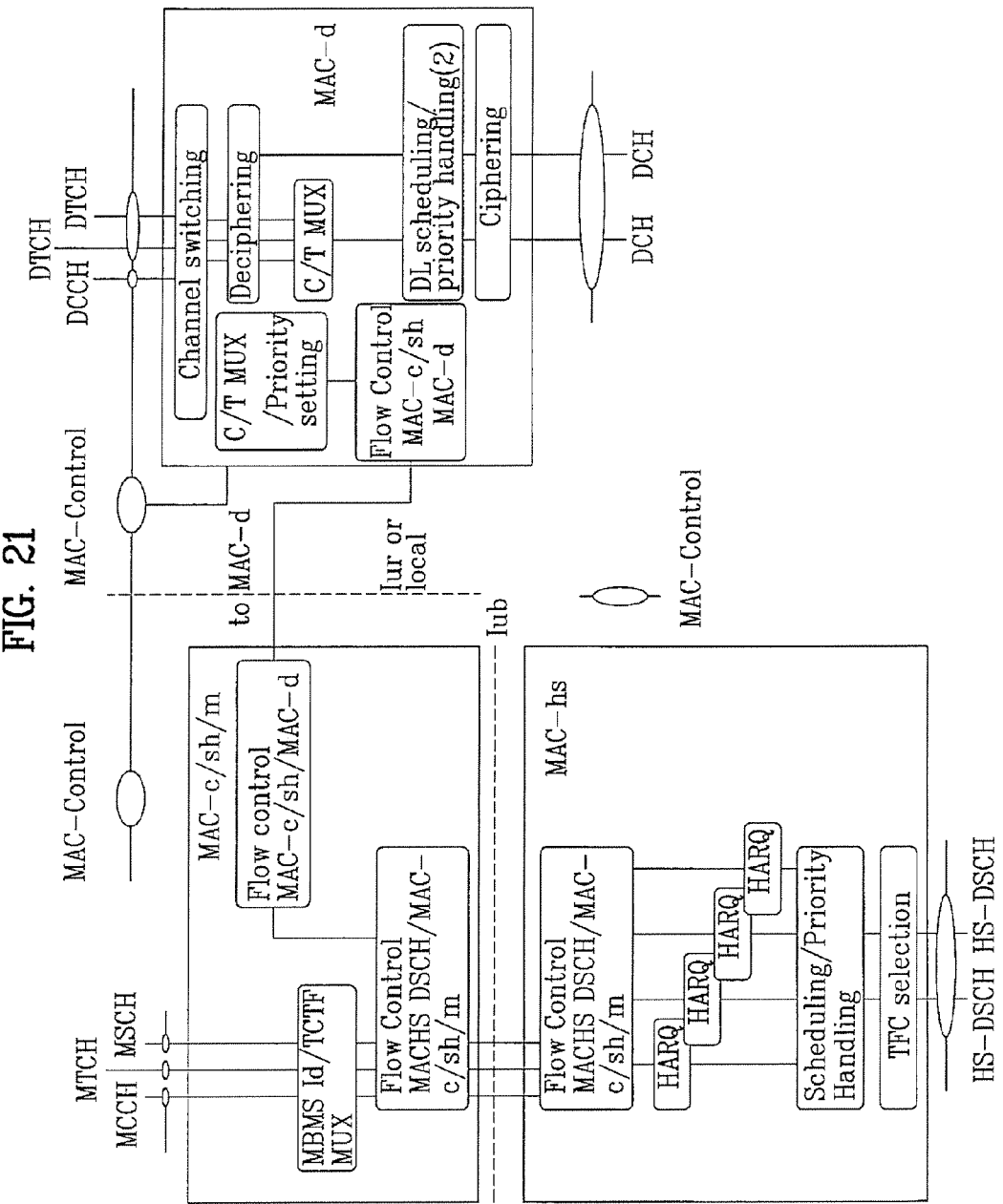
FIG. 21 illustrates a MAC of a UTRAN according to one embodiment of the present invention.

FIG. 21 illustrates a MAC of a UTRAN according to one embodiment of the present invention. For an MTCH in a MAC-c/sh/m, an MBMS-Id or a TCTF can be attached to a MAC SDU. For an MCCH or MSCH, a TCTF can be attached to the MAC SDU.

Figure 22:
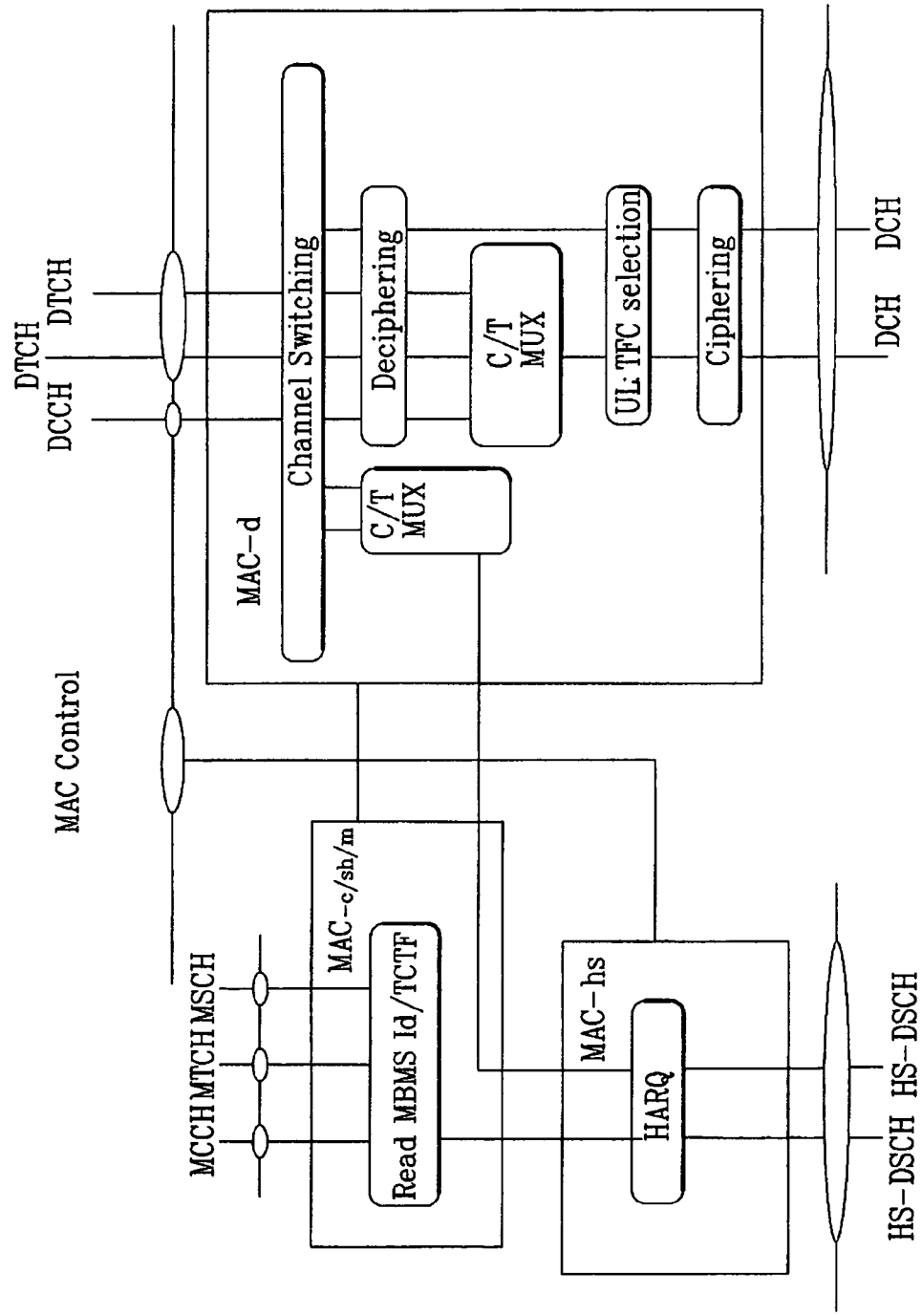
FIG. 22 illustrates a MAC of a UE according to one embodiment of the present invention.

FIG. 22 illustrates a MAC of a UE according to one embodiment of the present invention. For an MTCH in a MAC-c/sh/m, an MBMS-ID or a TCTF can be separated from a MAC PDU. For an MCCH or MSCH, the TCTF can be separated from the MAC PDU.

Figure 23:
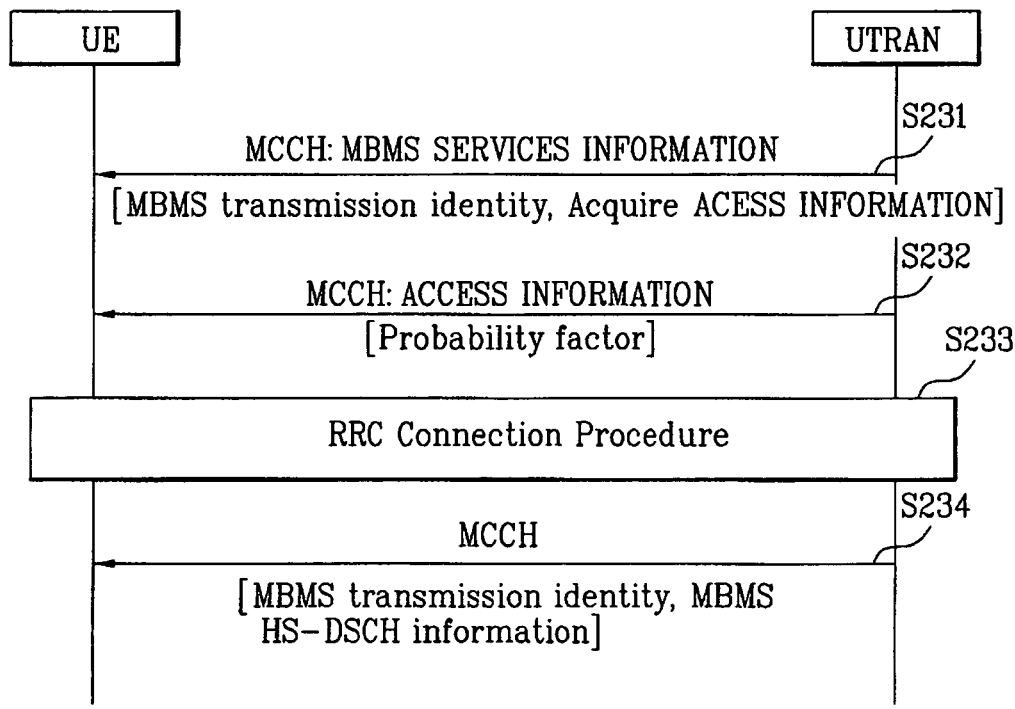
FIG. 23 is a flowchart of an MBMS channel determining process according to one embodiment of the present invention.

FIG. 23 illustrates an MBMS channel determination process according to one embodiment of the present invention. A UE receives an MBMS service information message via an MCCH. The UE receives information commanding the UE to receive an access information message together with an MBMS transmission identity of a service to which the UE has subscribed using the MBMS information message (S231).

The UE receives the access information message to perform an RRC connection procedure using a probability factor included in the received message (S232) and then performs the RRC connection procedure (S233). During the RRC connection procedure, the UE informs a UTRAN whether it is able to receive the MBMS via an HS-DSCH.

Via an MCCH, the UTRAN provides the MBMS via the HS-DSCH. The UTRAN indicates that the MBMS shall be provided via the HS-DSCH (S234). In order to indicate that the MBMS is to be provided, an MBMS transmission identity of the service and HS-DSCH information for the service are sent via the MCCH. The identity and the information are transmitted via the MBMS service information message.

Figure 24:
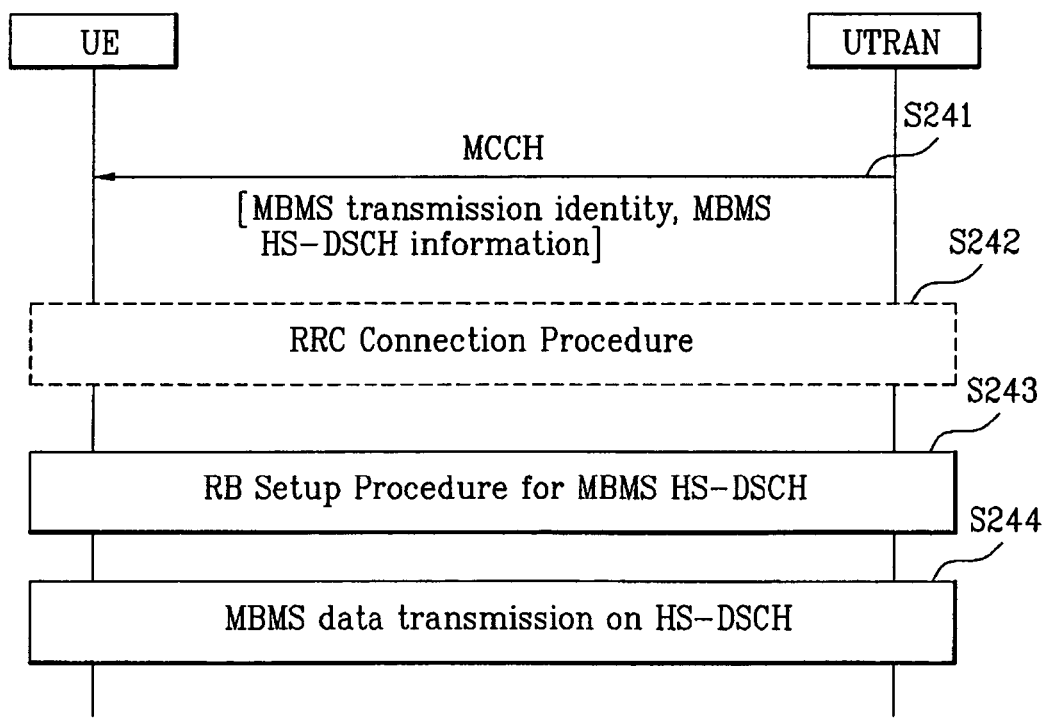
FIG. 24 is a flowchart of an MBMS channel establishing process according to one embodiment of the present invention.

FIG. 24 illustrates a process for establishing an MBMS channel according to one embodiment of the present invention. A UTRAN indicates, via an MCCH, that an MBMS shall be provided via an HS-DSCH (S241). In order to indicate that the MBMS is to be provided, an MBMS transmission identity of the service and HS-DSCH information for the service are sent via the MCCH. The identity and the information are transmitted via an MBMS service information message.

A UE, among a plurality of UEs capable of receiving the service via the HS-DSCH, that has not completed an RRC connection, carries out the RRC connection (S242). During the RRC connection procedure, the UE informs a UTRAN whether it is able to receive the MBMS via the HS-DSCH.

The UTRAN carries out an RB setup procedure for the UE capable of receiving the MBMS via the HS-DSCH (S243). Through this procedure, the HS-DSCH is established in the UE and the UTRAN transmits MBMS data via the established HS-DSCH (S244). The data transmission is carried out using, for example, the HS-SCCH, HS-DPCCH or F-DPCH.

Figure 25:
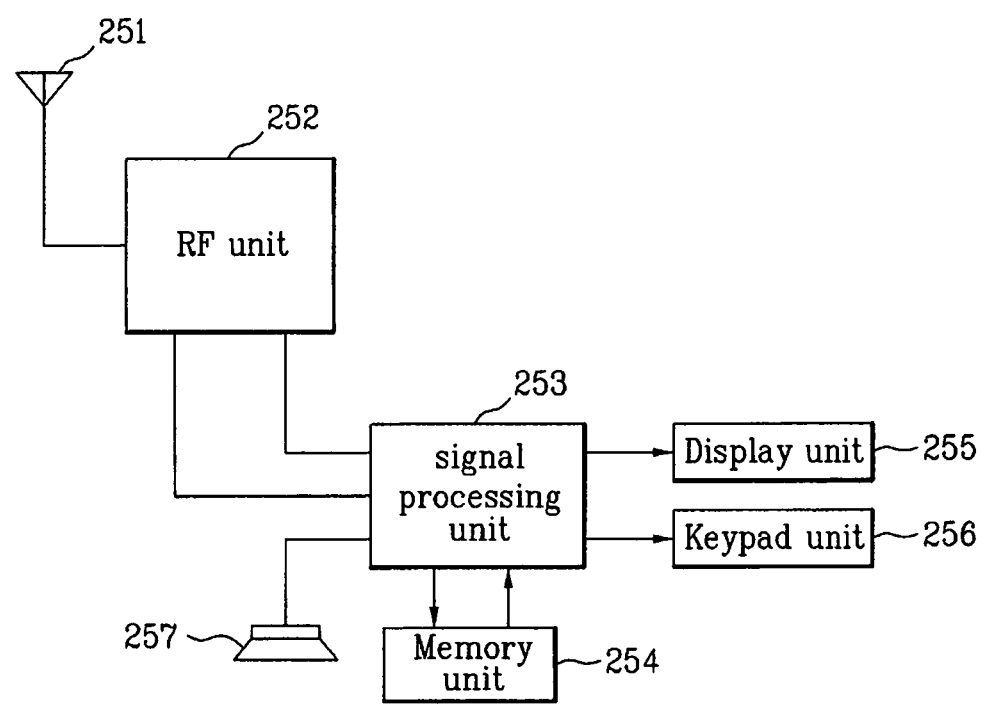
FIG. 25 is a block diagram of a radio communication apparatus according to one embodiment of the present invention.

FIG. 25 illustrates a block diagram of a radio communication apparatus according to one embodiment of the present invention. A radio communication apparatus according to the present invention includes an antenna unit 251, an RF (radio frequency) unit 252, a signal processing unit 253 and a memory unit 254. The signal processing unit 253 includes a processing unit such as a microprocessor and a digital processor. The radio communication apparatus according to the present invention further includes a display unit 255 for displaying specific information on a screen, a keypad unit 256 for receiving a signal from a user, and a speaker unit 257 for outputting a sound signal.

A UE identity and a multicast service identity are received via the antenna unit 251 and the RF unit 252. The signal processing unit 253 compares UE and multicast service identities previously stored in the UE to the received UE and multicast service identities, respectively.

If either the received UE or multicast service identity matches the stored UE or multicast service identity, a frame of a data corresponding to a specific frame of a control channel is received via the antenna and RF units 251 and 252. The signal processing unit 253 decodes the received frame of data and transmits control information including an ACK/NACK response signal according to the decoding result and a CQI via the antenna unit 251 and RF unit 252.

The above-described embodiments of the present invention are explained based on a cellular mobile communication network. Yet, the technical features of the present invention are not limited to the cellular mobile communication network and are applicable to a wireless communication system such as a PDA (personal digital assistant), a notebook computer equipped with a wireless communication function and the like. And, terms used in describing the present invention are not limited to a range of the wireless communication system such as UMTS. The present invention is applicable to wireless communication systems using different wireless interfaces and physical layers such as TDMA, CDMA, FDMA and the like.

Moreover, the technical features of the present invention can be implemented with software, firmware, hardware or one of combinations of the software, firmware and/or hardware. Namely, the contents of the present invention are implemented with hardware using a code, circuit chip and a hardware logic such as ASIC or with a code in a storage medium readable by a computer such as a hard disc, a floppy disc, a tape and the like or in a optical storage, ROM or RAM using a computer programming language.

Accordingly, the present invention enables the AMC and HARQ to be applied to the MBMS transmission, thereby enabling more efficient data transmissions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalent structures.

What is claimed is:

1. A method of receiving data at a user equipment (UE) in a mobile communications system, the method comprising:
    receiving at least a first frame of control information or a second frame of control information on a downlink high-speed shared control channel (HS-SCCH) having a 2 ms subframe containing 3 slots, the first frame of control information including a first identity that is common to more than one UE attempting to receive the same data and the second frame of control information including a second identity that is dedicated to the UE;
receiving a first frame of data on a high-speed physical downlink shared channel (HS-PDSCH) having a 2 ms subframe containing 3 slots, the first frame of data including data common to more than one UE;
transferring, by a Medium Access Control—high-speed (MAC-hs) entity managing a high-speed downlink shared channel (HS-DSCH) that is a transport channel, the data common to more than one UE to a Medium Access Control—common/shared/multimedia (MAC-c/sh/m) entity managing a common channel, the data common to more than one UE being received through the HS-DSCH which is mapped to the HS-PDSCH;
receiving a second frame of data on the HS-PDSCH, the second frame of data including UE dedicated data; and
transferring, by the MAC-hs entity, the UE dedicated data to a MAC-d entity managing a dedicated channel, the UE dedicated data being received through the HS-DSCH which is mapped to the HS-PDSCH.

2. The method of claim 1, wherein the MAC-hs entity processes the data common to more than one UE and the UE dedicated data using Hybrid Automatic Repeat Request (HARQ).

3. The method of claim 1, wherein downlink transmission on the HS-DSCH is associated with an uplink feedback signaling on an uplink high-speed dedicated physical control channel (HS-DPCCH) having a 2 ms subframe containing 3 slots.

4. The method of claim 3, wherein the uplink feedback signaling includes transmitting acknowledgement/negative acknowledgement (ACK/NACK) information for HARQ and channel quality indicator (CQI) on the HS-DPCCH.

5. The method of claim 4, wherein the ACK/NACK information for HARQ is transmitted in the first slot of the HS-DPCCH subframe and the CQI is transmitted in the second and third slots of the HS-DPCCH subframe.

6. The method of claim 1, wherein the first identity is a multimedia broadcast/multicast service (MBMS) identity.

7. The method of claim 1, wherein the second identity is a UE identity identifying the UE.

8. The method of claim 1, wherein the UE dedicated data is received on a logical channel DTCH (Dedicated Traffic Channel) or DCCH (Dedicated Control Channel).

9. A method of transmitting data to at least one user equipment (UE) in a mobile communications system, the method comprising:
transmitting at least a first frame of control information or a second frame of control information to the at least one UE on a downlink high-speed shared control channel (HS-SCCH) having a 2 ms subframe containing 3 slots, the first frame of control information including a first identity that is common to more than one UE attempting to receive the same data and the second frame of control information including a second identity that is dedicated to the at least one UE;
receiving, by a Medium Access Control—high-speed (MAC-hs) entity managing a high-speed downlink shared channel (HS-DSCH) that is a transport channel, data common to more than one UE from a Medium Access Control—common/shared/multimedia (MAC-c/sh/m) entity managing a common channel, the data common to more than one UE being transmitted through the HS-DSCH which is mapped to the HS-PDSCH having a 2 ms subframe containing 3 slots;
transmitting a first frame of data on the HS-PDSCH, the first frame of data including the data common to more than one UE;
receiving, by the MAC-hs entity, UE dedicated data from a MAC-d entity managing a dedicated channel, the UE dedicated data being transmitted through the HS-DSCH which is mapped to the HS-PDSCH;
transmitting a second frame of data on the HS-PDSCH, the second frame of data including the UE dedicated data.

10. The method of claim 9, wherein the MAC-hs entity processes the data common to more than one UE and the UE dedicated data using Hybrid Automatic Repeat Request (HARQ).

11. The method of claim 9, wherein downlink transmission on the HS-DSCH is associated with an uplink feedback signaling on an uplink high-speed dedicated physical control channel (HS-DPCCH) having a 2 ms subframe containing 3 slots.

12. The method of claim 11, wherein the uplink feedback signaling includes receiving acknowledgement/negative acknowledgement (ACK/NACK) information for HARQ and channel quality indicator (CQI) on the HS-DPCCH.

13. The method of claim 12, wherein the ACK/NACK information for HARQ is received in the first slot of the HS-DPCCH subframe and the CQI is received in the second and third slots of the HS-DPCCH subframe.

14. The method of claim 9, wherein the first identity is a multimedia broadcast/multicast service (MBMS) identity.

15. The method of claim 9, wherein the second identity is a UE identity identifying the UE.

16. The method of claim 9, wherein the UE dedicated data is transmitted on a logical channel DTCH (Dedicated Traffic Channel) or DCCH (Dedicated Control Channel).

* * * * *